United States Patent
Nierlich et al.

(10) Patent No.: US 9,467,026 B2
(45) Date of Patent: Oct. 11, 2016

(54) ELECTROMECHANICAL ACTUATOR

(71) Applicant: MESSIER-BUGATTI-DOWTY, Velizy-Villacoublay (FR)

(72) Inventors: Florent Nierlich, Velizy-Villacoublay (FR); Etienne Annee, Velizy-Villacoublay (FR); Raphael Pierra, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 0 days.

(21) Appl. No.: 14/329,006

(22) Filed: Jul. 11, 2014

(65) Prior Publication Data

US 2015/0015127 A1    Jan. 15, 2015

(30) Foreign Application Priority Data

Jul. 12, 2013    (FR) .................................... 13 56900

(51) Int. Cl.
*H02K 11/00* (2016.01)
*H02K 3/24* (2006.01)
*H02K 19/36* (2006.01)
*H02K 3/50* (2006.01)

(52) U.S. Cl.
CPC ........... *H02K 11/0073* (2013.01); *H02K 11/30* (2016.01); *H02K 11/33* (2016.01); *H02K 3/50* (2013.01); *H02K 2213/06* (2013.01); *H02K 2213/12* (2013.01)

(58) Field of Classification Search
CPC ................ H02K 11/00; H02K 11/04
USPC ................... 310/64, 66, 68 R, 68 D
See application file for complete search history.

(56) References Cited

U.S. PATENT DOCUMENTS

| | | | |
|---|---|---|---|
| 2007/0024133 A1 | 2/2007 | Kato et al. | |
| 2008/0303362 A1* | 12/2008 | Nakajima | ............... H02K 1/02 310/72 |
| 2012/0269666 A1* | 10/2012 | Lin et al. | ................... 417/423.7 |
| 2012/0274158 A1* | 11/2012 | Chun et al. | ..................... 310/53 |

FOREIGN PATENT DOCUMENTS

| | | |
|---|---|---|
| DE | 79 19 276 U1 | 10/1979 |
| DE | 7919276 U1 * | 10/1979 |
| DE | EP0092067 A * | 10/1983 |
| DE | 10 2005 032 965 A1 | 3/2007 |
| DE | 102005032965 A1 * | 3/2007 |
| DE | 10 2009 002 420 A1 | 10/2010 |

(Continued)

OTHER PUBLICATIONS

Search Report of FR 1356900 dated Mar. 14, 2014.

(Continued)

*Primary Examiner* — Jose Gonzalez Quinones
(74) *Attorney, Agent, or Firm* — Sughrue Mion, PLLC

(57) ABSTRACT

An electromechanical actuator comprising an actuator member and an electric motor (2) adapted to drive the actuator member. The electric motor (2) comprises a rotor portion (4), a stator portion (5) comprising a yoke-forming body (9) and a set of coils received in slots (12) in the body (9), and at least one electrical module (17). The electrical module is adapted to generate an electrical power supply current (Ia) for the electric motor (2), which current flows in the set of coils. The electrical module (17) is carried by the body (9).

12 Claims, 2 Drawing Sheets

(56) References Cited

FOREIGN PATENT DOCUMENTS

| | | |
|---|---|---|
| DE | 10 2009 002 422 A1 | 10/2010 |
| DE | 102009002420 A1 * | 10/2010 |
| EP | 0 092 067 A1 | 10/1983 |
| EP | 2 161 819 A1 | 3/2010 |
| EP | 2161819 A1 * | 3/2010 |
| EP | 2 704 297 A1 | 3/2014 |
| GB | 2462940 A * | 3/2010 |
| GB | 2494797 A | 3/2013 |
| JP | 2007-028845 A | 2/2007 |

OTHER PUBLICATIONS

Written Opinion of FR 1356900 dated Mar. 14, 2014.

* cited by examiner

ELECTROMECHANICAL ACTUATOR

The invention relates to an electromechanical actuator having an electric motor including a stator portion carrying an electrical module powering the motor.

BACKGROUND OF THE INVENTION

Numerous electromechanical actuators are to be found in modern aircraft, and they are used in a variety of applications: flight controls, braking, etc.

Electromechanical actuators comprise an actuator member and an electric motor adapted to drive the actuator member.

The electric motor of the actuator is incorporated in an electrical system of the aircraft that includes not only the motor in question but generally also includes a power unit generating a power supply signal for the motor and a control unit that receives a setpoint and that controls the power unit as a function of the setpoint. When the motor is an alternating current (AC) motor, the power unit comprises an inverter that transforms a direct current (DC) voltage into an AC voltage in order to generate the power supply signal for the motor.

Complying with electromagnetic compatibility standards is a major constraint when designing such electrical systems. Large variations in current and voltage are created by the switches of the inverter and they are transmitted to these motors while generating large amounts of electromagnetic disturbance by conduction and by radiation.

OBJECT OF THE INVENTION

An object of the invention is to reduce the above-mentioned electromagnetic disturbances.

SUMMARY OF THE INVENTION

In order to achieve this object, an electromechanical actuator is provided with an actuator member and an electric motor adapted to drive the actuator member, the electric motor comprising:
  a rotor portion;
  a stator portion comprising a yoke-forming body and a set of coils received in slots in the body; and
  at least one electrical module adapted to generate an electrical power supply current for the electric motor, which current flows in the set of coils.

According to the invention, the electrical module is carried by the body.

Thus, the electrical power supply current is generated by the electrical module situated in the immediate proximity of the set of coils. Operating the actuator thus no longer requires an AC voltage to be conveyed in the aircraft between an external power unit and the actuator. Since a large amount of the electromagnetic disturbances come from a cable conveying such an AC voltage, this considerably reduces the electromagnetic disturbances. The electric motor is indeed connected by a cable to an external power supply unit, but that cable conveys a DC voltage and therefore gives rise to considerably smaller electromagnetic disturbances.

BRIEF DESCRIPTION OF THE DRAWINGS

The invention can be better understood in the light of the following description given with reference to the figures of the accompanying drawings, in which.

DETAILED DESCRIPTION OF THE INVENTION

Figure 1:
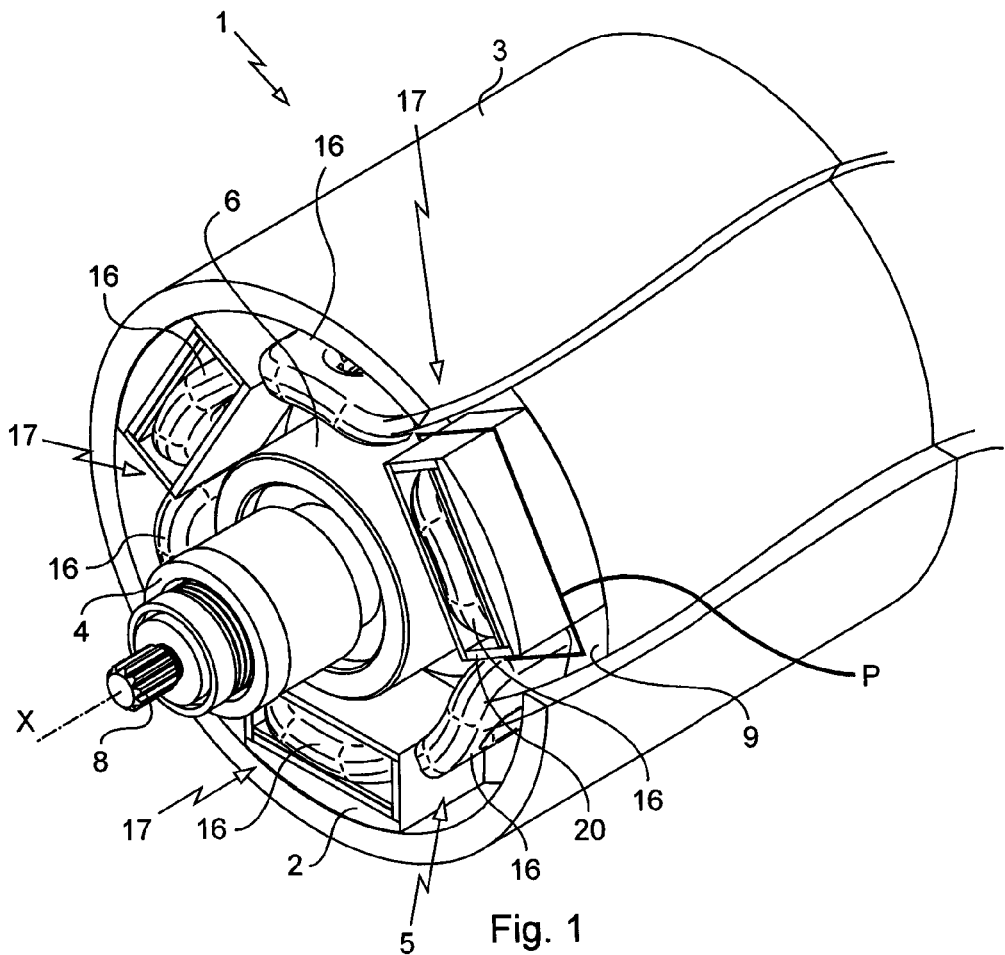
FIG. 1 shows an electromechanical actuator of the invention in a first embodiment.
Figure 2:
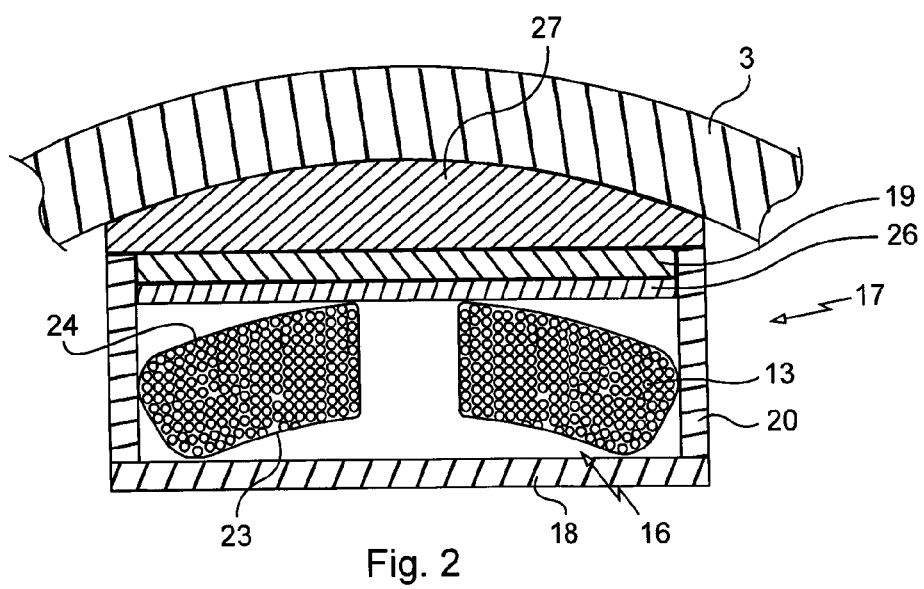
FIG. 2 is a section view on a plane P of FIG. 1 showing an electrical module of the actuator of the invention in the first embodiment.

With reference to FIGS. 1 and 2, an electromechanical actuator 1 of the invention in a first embodiment comprises an actuator member (not shown in the figures) and an electric motor 2 adapted to drive the actuator member.

To illustrate the invention, there follows a description of the electromechanical actuator 1 of the invention in a first embodiment in an application to provide electric braking for an aircraft. The actuator member of the actuator 1 is thus a pusher having a shoe for exerting a braking force on friction members of a brake of an aircraft landing gear wheel, e.g. against a carbon disk stack of the brake. The actuator 1 is carried by an actuator carrier of said brake.

The electric motor 2 of the actuator 1 in this example is a three-phase synchronous electric motor with permanent magnets having a casing 3, a rotor portion 4, and a stator portion 5.

The rotor portion 4 has ten magnets 6 and a shaft of the motor 2 of axis X and that has a fluted end 8 enabling rotary motion of the shaft of the motor 2 to be transmitted via stepdown gearing to a screw-nut connection that transforms this rotary movement in known manner into sliding of the pusher of the actuator 1.

The stator portion 5 has a yoke-forming body 9, said yoke being made up of a stack of magnetic laminations arranged substantially parallel to a plane perpendicular to the axis X. The yoke has a plurality of teeth defining slots that are oriented longitudinally. Electrical conductor wires 13 are arranged in the slots to constitute a set of coils comprising a certain number of coils 15 received in said slots and projecting from the yoke to form winding overhangs 16. As can be seen in FIG. 1, in this example the yoke 9 of the stator portion 5 has twelve slots receiving six coils 15 forming six overhangs 16.

The motor 2 is powered and controlled by electrical power supply current Ia flowing through the set of coils, and formed specifically in this example by three phase currents Ip, each flowing in one phase of the electric motor 2. The power supply electric current Ia is generated from a DC voltage Vce input to the motor and a control signal Sce also input to the motor, the input DC voltage Vce and the input control signal Sce being generated respectively by an external power unit and by an external control unit situated inside the aircraft, the signal being conveyed by a shielded cable running inside the aircraft and along the landing gear to the actuator carrier that carries the actuator of the invention. The power supply cable is connected to the motor 2 via an electric connector that is positioned in conventional manner on the actuator 1.

Three electrical modules 17 that are shown diagrammatically in the figures receive the DC input voltage Vce and the input control signal Sce, and each of them generates a respective phase current Ip. Each electrical module 17 is positioned at least in part against an overhang 16. Each electrical module 17 includes a control unit 18, a power unit 19, fastener means 20, and connection means.

The control unit 18 of each electrical module 17 extends against a first face 23 of the overhang 16 facing the stator portion 5.

The power unit 19 extends facing a second face 24 of the overhang 16 facing the casing 3 of the motor 2.

The control unit 18 and the power unit 19 are fastened together and held against the overhang 16 by fastener means 20 that extend along lateral regions of the overhang 16 and that conventionally include well-known fastener components that are not shown in detail, which components include for example spacers, pillars, rivets, slideways, adhesive, etc. The control unit 18 and the power unit 19 are electrically connected by connection means, which are also formed of conventional connection components, including for example wires, connectors, etc. The connection means (not shown in FIG. 1) extend along the fastener means. Each electrical module 17 thus surrounds an overhang 16, at least in part.

A thermal lagging element 26 or insulating plate extends between the power unit 19 and the overhang 16. This lagging plate 26 serves to ensure that the phase current Ip flowing in the coil 15 does not increase the temperature of the electrical module 17 excessively.

A thermally conductive element 27 extends between the power unit and the casing of the motor. This thermally conductive element 27 serves to dissipate the heat generated by operation of the electrical module 17 into the casing 3.

A potting resin then covers each of the overhangs 16 fitted with its electrical module 17, and also the control unit 18, the power unit 19, the fastener means 20, the connection means, the lagging plate 26, and the thermally conductive element 27. This forms a solid and compact assembly around the overhang 16.

Figure 3:
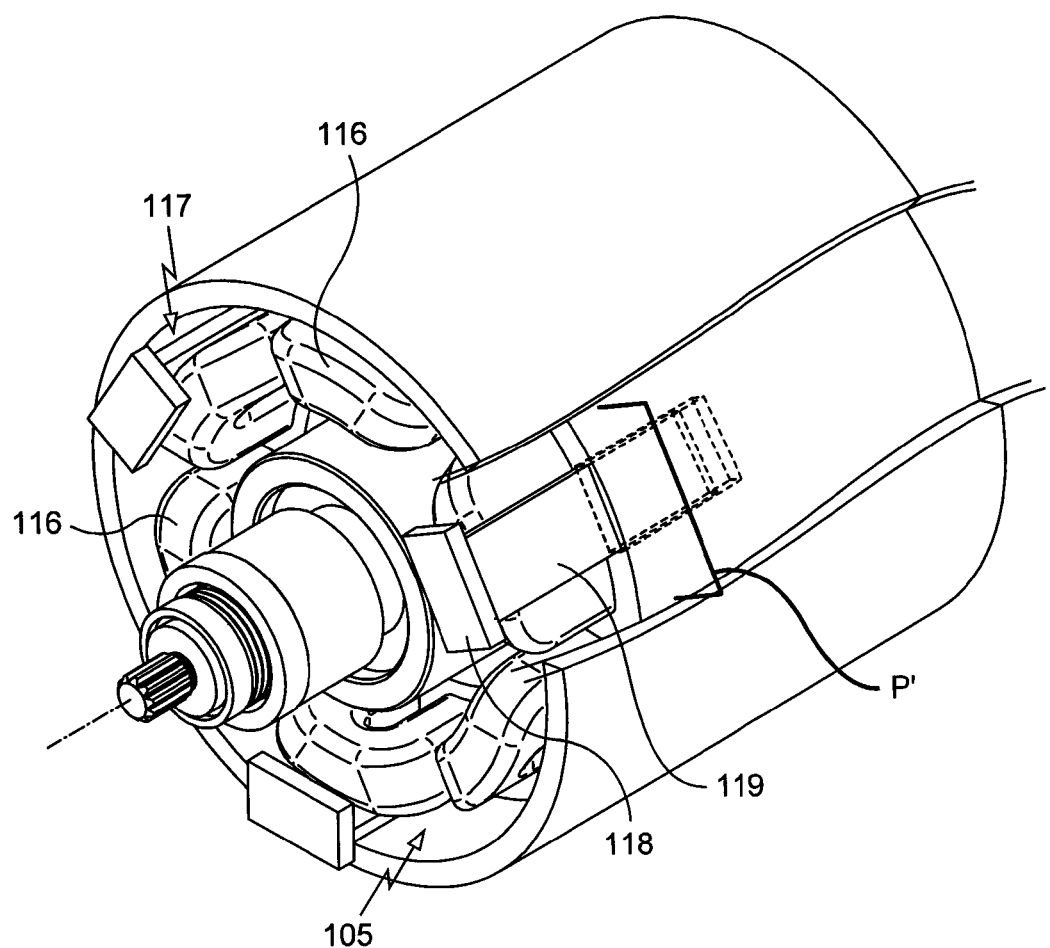
FIG. 3 shows an electromechanical actuator of the invention in a second embodiment.
Figure 4:
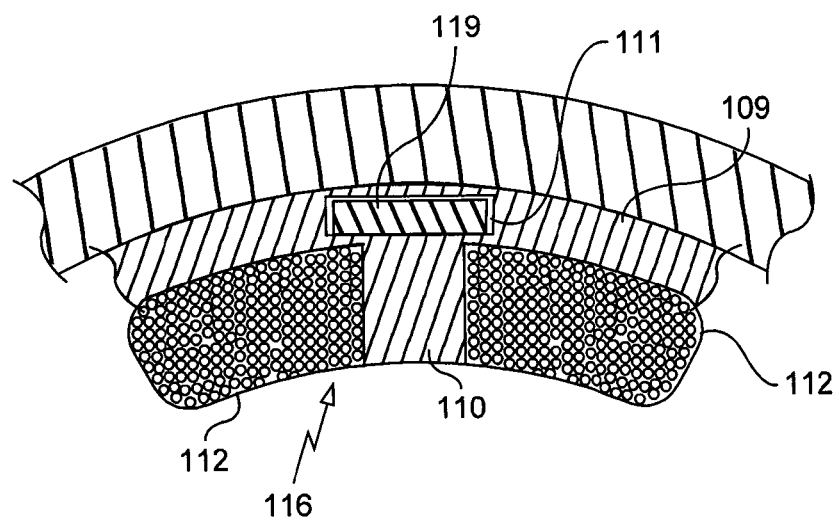
FIG. 4 is a section view on a plane P' of FIG. 3 showing an electrical module of the actuator of the invention in the second embodiment.

In a second embodiment, shown in FIGS. 3 and 4, and in which each element corresponding to an element of FIG. 1 is referenced with the same reference number plus one hundred, each electrical module 117 is positioned at least in part over an overhang 116, and at least in part inside a housing 111 in the body 109 of the stator portion 105, said housing 111 in this example being situated between two slots 112 in the body 109 of the stator portion 105, and more precisely between a tooth 110 defined by two slots 112 and the casing 103 of the motor. The housing 111 extends longitudinally in the body 109 along the coil 115 that has a projecting portion forming the overhang 116. The control unit 118 is situated over the overhang 116. The power unit 119 is situated in the housing 111. Fastener means and connection means once more make mechanical and electrical connections between the control unit 118 and the power unit 119.

The characteristics of the electrical elements of the motor 2 of the actuator 1 of the invention are described below. In each of the above-described embodiments, each power unit 19, 119 of the electrical modules 17, 117 has power transistors, transistor control means, and filter means. Each control unit 18, 118 has control means for controlling the power unit 19, 119.

The power transistors of the power unit 19, 119 are connected to the DC input voltage Vce via the filter means that filter the DC input voltage so as to eliminate the disturbances to which it is subjected, in particular as a result of being conveyed in the cable that connects the actuator to the external power unit. The transistors are controlled by the control means, which are themselves controlled by an internal control signal generated by the control unit 18, 118 on the basis of the input control signal Sce. The transistors of the power unit 19, 119 thus form an inverter powered by the DC input voltage Vce as filtered and controlled by the internal control signal. The inverter thus generates the respective phase currents Ip of the electrical power supply current Ia. The power transistors are electrically connected to the coils in order to deliver the phase currents Ip thereto.

In particular, the power transistors may be connected in an inverter arm or H-bridge topological configuration. This thus produces a three-phase electric motor in which some of the ends of the coils 15 are connected so as to create a neutral in the winding. It is thus possible to obtain a two-star three-phase motor in which some of the ends of the coils 15 are connected so as to create two neutrals in the winding. Finally, it is possible to obtain an electric motor having six independent phases, in which no neutral is required.

Advantageously, the control unit of an electrical module includes an electrical component of hybrid technology which is itself made up of a certain number of integrated circuits incorporated directly within a common package. Such a hybrid component presents improved high-temperature behavior, thereby enabling the control unit of the electrical module to be made more compact.

Advantageously, provision is made for the body 9, 109 of the stator portion 5, 105 to be provided with cavities containing a so-called "phase-change" material. Such a material, which may be liquid, solid, gaseous, or heterogeneous, changes phase at a predetermined temperature. By changing phase, the phase-change material stores a relatively large quantity of heat energy that it releases subsequently on returning to its initial phase. It is preferable to select a material that changes phase at a temperature below a maximum temperature for the electrical modules 17, 117, which maximum temperature may for example be the temperature beyond which the operation of the modules 17, 117 is disturbed by temperature, or indeed the temperature beyond which some of the components in the modules 17, 117 run the risk of being degraded. Thus, when the temperature of the motor 2 increases, the phase-change material heats up and absorbs heat, thereby having the effect of limiting the temperature rise. In contrast, when temperature decreases, the material restores that heat: this tends to make the temperature in the motor 2 more uniform.

Phase-change materials are particularly advantageous in an application to aircraft braking. During emergency braking, it can happen that the temperature of the motor increases very significantly. Such increases in temperature are short and infrequent and the use of phase-change materials is entirely suitable for making temperature more uniform in such situations.

The invention is not limited to the particular embodiment described above, but on the contrary covers any variant coming within the ambit of the invention as defined by the claims.

Although the invention is illustrated in an application to an electric braking system, an actuator of the invention may be used in a wide variety of applications (flight controls, etc.).

Although the motor of the invention is a three-phase synchronous motor with six coils, the invention could naturally be implemented on other motors.

It is also possible to provide some other number of electrical modules, e.g. a single module, or to provide for each module to include a single electronic card carrying both the control unit and the power unit, etc.

The invention claimed is:

1. An electromechanical actuator comprising an actuator member and an electric motor adapted to drive the actuator member, the electric motor comprising:
   a rotor portion;
   a stator portion comprising a yoke-forming body and a set of coils disposed in slots in the body, wherein the set of coils forms a winding overhang having a first face and an opposed second face; and
   at least one electrical module adapted to generate an electrical power supply current for the electric motor, which current flows in the set of coils;
   wherein the at least one electrical module is carried by the body;
   wherein at least a part of the at least one electrical module is positioned to abut against a portion of at least one of the first face and the second face of the winding overhang formed by the set of coils.

2. The electromechanical actuator according to claim 1, wherein the electrical module is positioned at least in part over the portion of the set of coils forming the winding overhang.

3. The electromechanical actuator according to claim 1, wherein the electrical module is arranged so as to surround, at least in part, the portion of the set of coils forming the winding overhang.

4. The electromechanical actuator according to claim 1, wherein the electrical module is positioned at least in part inside a housing in the body.

5. The electromechanical actuator according to claim 4, wherein said housing is situated between the slots in the body.

6. The electromechanical actuator according to claim 1, wherein the electrical module comprises a control unit and a power unit.

7. The electromechanical actuator according to claim 6, wherein the power unit comprises a power transistor, and wherein the control unit comprises a hybrid technology electrical component.

8. The electromechanical actuator according to claim 1, further comprising wherein a thermally conductive element situated between the electrical module and a casing of the electric motor.

9. The electromechanical actuator according to claim 1, wherein a thermal lagging element extends between the electrical module and the set of coils.

10. The electromechanical actuator according to claim 1, wherein the electrical module is covered in a potting resin after being installed on the body.

11. The electromechanical actuator according to claim 1, wherein the body of the stator portion comprises at least one cavity containing a phase-change material.

12. The electromechanical actuator according to claim 11, wherein the phase-change material changes phase at a temperature lower than a maximum temperature of the electrical module.

* * * * *